Jan. 19, 1954 K. JUNKMANN ET AL 2,666,435
SURGICAL INJECTION DEVICE
Filed Dec. 19, 1950

INVENTORS
KARL JUNKMANN
AND HEINZ RÖHRIG
BY Klein Hart
ATTORNEYS

Patented Jan. 19, 1954

2,666,435

UNITED STATES PATENT OFFICE 2,666,435

SURGICAL INJECTION DEVICE

Karl Junkmann, Berlin, and Heinz Röhrig, Berlin-Köpenick, Germany, assignors to Schering A. G., Berlin, Germany, a corporation of Germany Application December 19, 1950, Serial No. 201,546

5 Claims. (Cl. 128—218)

This invention relates to a device for the subcutaneous or intramuscular administration of accurately dosed medicaments in very small quantities.

In modern therapy the subcutaneous or intramuscular administration of medicaments in solid or liquid form has been practised for a considerable time.

These known operations have for their purpose the administration of suitable but usually large volumes of medicament preparations for "Depot" purposes. The device of the present invention renders possible a sterile subcutaneous or intramuscular administration of very small and very accurate doses in salve or paste or the like form in a simple and convenient manner, which is of particular importance in the case of expensive medicaments.

The device of the present invention has a hollow elongated needle and a plunger working in the bore of the said needle, the movement of the plunger in the needle being regulated in such a manner that medicament present in the needle in salve, paste or the like form under sterile conditions can be quantitively expressed by the plunger. The plunger may be in the form of a cylindrical rod fitting the bore of the needle.

The device may be composed of parts in telescopic relation one of which parts is integral with the needle and another of which is integral with the plunger.

The use of the device according to the invention is effected in such a manner that an accurately dosed quantity of the medicaments to be administered, worked up to a salve or paste, is introduced by means of a filling device in a sterile manner into the sterile hollow needle of the device from which it is quantitatively expressed by means of the plunger. In this operation nothing is lost, even in the case of very small quantities of the medicament accurately measured in order to attain the desired effect.

Figure 1:
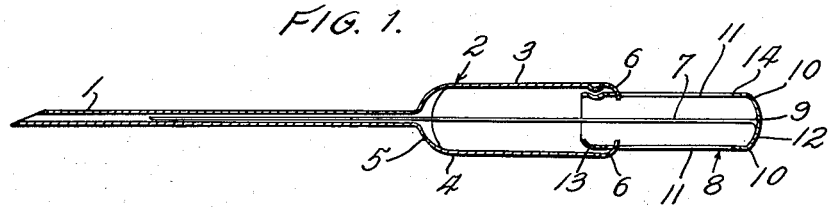
Figure 2:
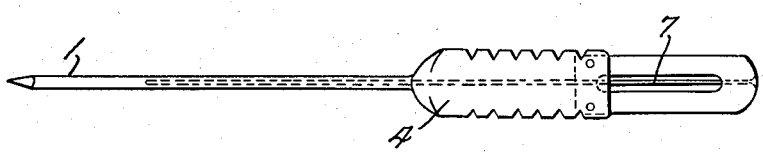
Figure 3:
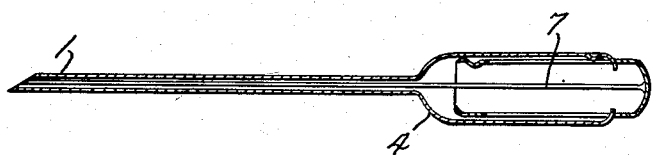
Figure 4:
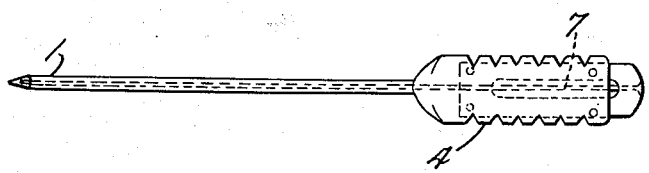

In the drawing Figs. 1 and 3 are longitudinal sectional views of an injection device before and after use, respectively, and Figs. 2 and 4 are corresponding elevations.

The hollow elongated needle 1 is secured substantially centrally of the guide 2 which is made up of two oppositely spaced plates 3—4 meeting at one end in a U-shaped terminal 5. The plates 3—4, at their other ends are free and spaced apart each being provided at its free end with a lug 6 as shown in Figs. 1 and 3.

The plunger 7, which is longer than the needle 1, is integral with the head 8 which carries the upper end 9 of the plunger 7. The head 8 has two plates 10—10 which are each provided with a guideway 11 in the form of slots. The plates 10—10 terminate in a U-shaped end 12. The lugs 6 are positioned and slide in the guideways 11 thereby insuring that the inner surfaces of the plates of the guide and head are always in surface engagement and the device is retained in assembled condition.

The relative relation of the guide 2 and head 8 determines the extent of rearward movement of the plunger 7 in the bore of the hollow needle and through the guide 2. The lugs 6 determine the limit of rearward movement of the plunger 7 by their engagement with the wall 13 (Fig. 1) and determine the limit of the forward movement of the plunger 7 by engagement with the stops 14 as illustrated in Fig. 3.

When the plunger 7 is projected forwardly to the limit of its movement, its end coincides with the end of the needle, during which operation the administration of the medicament takes place.

The inner surfaces of the corresponding plates 3—4 and 10—10 are always in surface contact and guide the guide and head during relative sliding movement. The U-shaped portions 5 and 12 face one another thereby providing two parts in telescopic relation.

We claim:

1. Apparatus for injecting a small, accurate and sterile quantity of a medical preparation, intramuscularly or subcutaneously, comprising a hollow needle, a plunger, said plunger being adapted to slide in said needle, a pair of telescoping cooperating members, one of said members carrying the needle and the other member carrying the plunger, the plunger-carrying member being adapted to slide with respect to the needle-carrying member and means to relatively guide said parts during such sliding movement.

2. Apparatus for injecting a small, accurate and sterile quantity of a medicinal preparation, intramuscularly or subcutaneously, comprising a U-shaped guide, an elongated hollow needle carried by the guide, a head, a plunger longer than said needle carried by said head, said plunger being adapted to slide in said needle, said needle being substantially centrally secured at the outer end of said U-shaped guide, said guide having two plates spaced apart at their free ends, a guideway in said head and means on said guide adapted to slide in said guideway, means at the end of said guideway limiting the extent of sliding movement of said head in respect to said guide, the free end of said plunger when the head is projected inwardly to its full extent coinciding with the end of the needle.

3. Apparatus for injecting a small, accurate and sterile quantity of a medical preparation, intramuscularly or subcutaneously, comprising a hollow needle, a plunger in said needle, said plunger being adapted to slide in said needle, a pair of telescoping cooperating U-shaped members, said members being at all times in relative engagement, one of said members carrying the needle and the other member carrying the plunger, the plunger-carrying member being adapted to slide with respect to the needle-carrying member and means to relatively guide said parts during such sliding movement.

4. In an apparatus of the character set forth in claim 3 in which one of said members is provided with a slot and the other member with means extending into said slot to relatively guide the members during sliding movement.

5. In an apparatus of the character set forth in claim 3 in which the telescoping cooperating members are each comprised of two plates, the inner surfaces whereof are in surface contact with each other at all times.

KARL JUNKMANN.
HEINZ RÖHRIG.

References Cited in the file of this patent

UNITED STATES PATENTS

| Number | Name | Date |
|---|---|---|
| 1,087,845 | Stevens | Feb. 17, 1914 |
| 1,527,291 | Zorraquin | Feb. 24, 1925 |
| 2,009,393 | Failla | July 30, 1935 |
| 2,389,355 | Goland et al. | Nov. 20, 1945 |
| 2,513,014 | Fields | June 27, 1950 |

FOREIGN PATENTS

| Number | Country | Date |
|---|---|---|
| 624,269 | Great Britain | June 1, 1949 |